United States Patent

[11] 3,580,137

[72] Inventor Karl A. Brandenberg
Hayward, Calif.
[21] Appl. No. 761,238
[22] Filed Sept. 20, 1968
[45] Patented May 25, 1971
[73] Assignee The Aro Corporation
Bryan, Ohio

[54] FLUID PROXIMITY SENSOR AND DRIVE MECHANISM TO CONTROL DISTANCE OF AN OBJECT FROM THE SENSOR
12 Claims, 9 Drawing Figs.
[52] U.S. Cl. .................................................91/50, 91/2,
91/305, 91/307, 137/624.14, 251/33
[51] Int. Cl. .......................................................F15b 11/15,
F01l 15/04, F01l 25/06
[50] Field of Search........................................... 91/50,
(Cards), 47, 48, 49, 51, 388, 306, 307, 2,
(Cursory)

[56] References Cited
UNITED STATES PATENTS

| | | | |
|---|---|---|---|
| 3,283,669 | 11/1966 | Lissau ......................... | 91/388 |
| 3,296,941 | 1/1967 | Rochte ......................... | 91/306 |
| 3,340,896 | 9/1967 | Mon et al....................... | 91/307 |
| 3,393,606 | 7/1968 | Magnani et al. ............... | 91/47 |
| 3,415,163 | 12/1968 | Inaba et al. ................... | 91/388 |
| 3,418,941 | 12/1968 | Mowbroy....................... | 91/47 |

Primary Examiner—Paul E. Maslousky
Attorney—Bair, Freeman and Molinare

ABSTRACT: A unipressure fluid logic control and power supply device which utilizes a single air pressure source for sensing and indicating the proximity or gap between a sensor and a driven element. The same supply means provides power to an air motor which drives the driven member and maintains it in a desired position in relation to the proximity sensor. The sensing device includes a fluid oscillator adapted to drive the piston-type air motor and an air inhibitor which prevents the oscillator from operating whenever a sensed fluid signal indicates the proximity or position of the driven member is as desired.

Inventor:
Karl A. Brandenberg
By Bair, Freeman & Molinare
Attys.

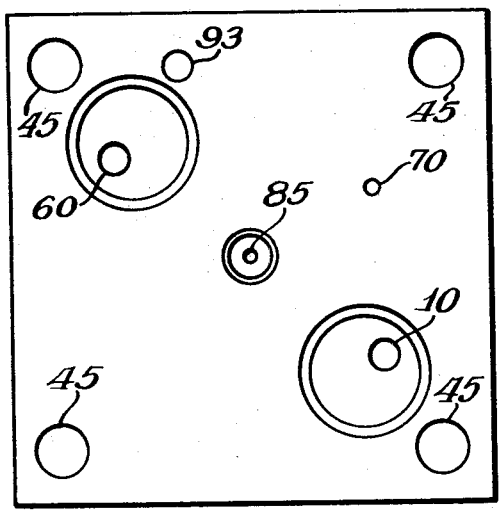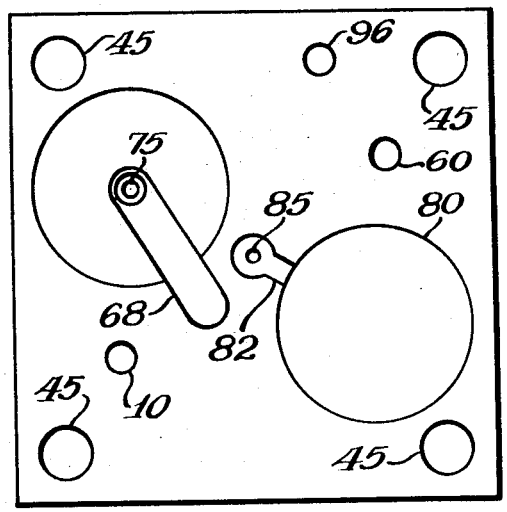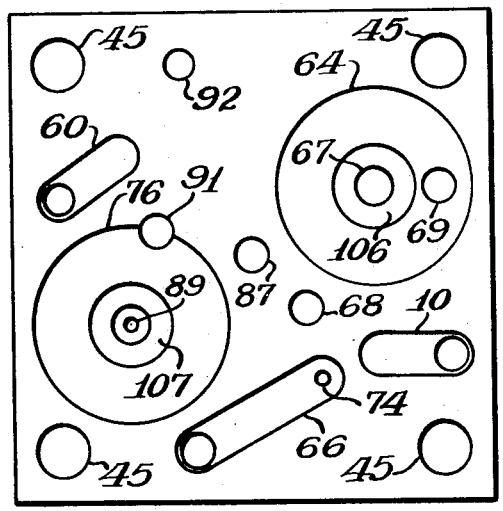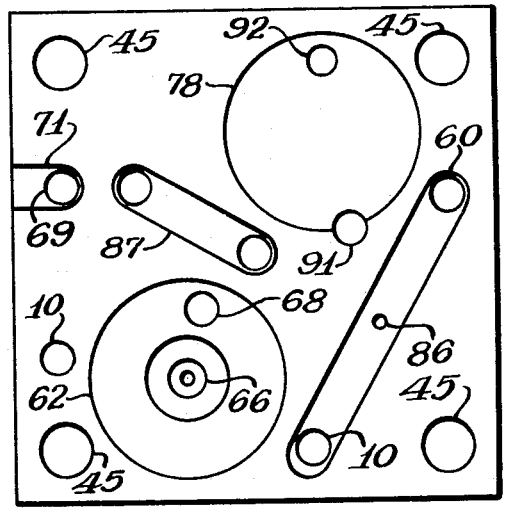

Inventor:
Karl A. Brandenberg
By Bair, Freeman & Molinare
Attys.

3,580,137

FLUID PROXIMITY SENSOR AND DRIVE MECHANISM TO CONTROL DISTANCE OF AN OBJECT FROM THE SENSOR

BACKGROUND OF THE INVENTION

This invention relates to a fluid control device and more particularly to a unipressure fluid logic control and power supply device adapted to sense a physical parameter and drive a fluid motor in logical response to the sensed parameter.

The use of fluidic sensing devices to provide control signals for various fluid driven mechanical apparatus is well known. Normally such fluid flow signals are provided through the operation of heavy duty valving elements having movable seats and seals operable in the pressure ranges for pneumatic tools and the like of more than 50 p.s.i.g. The sensitivity of such pneumatic sensing devices is limited.

To increase sensitivity, pure fluidic devices are often utilized. However, pure fluidic devices operate best at low pressure, e.g. less than 5 p.s.i.g. Thus, an interface must usually be provided between the low-pressure signals of the pure fluidic devices and the output signals to the machine which the fluidic control system is adapted to control. For example the interface mechanism may be a fluid actuated electric signal. The electric signal in turn, will provide a signal to cause a mechanical change in the configuration of the mechanical apparatus. This type of construction requires additional parts and results in additional possibilities of failure.

It is thus desirable, for many application, to provide a device which is adapted to control and drive an apparatus utilizing the same fluid pressure source. It is also desirable to maintain a high degree of control sensitivity for the apparatus. Obviously higher pressures would result in a loss of sensitivity whereas lower pressures would result in a loss of fluid driving power. In pneumatic devices, control and driving pressure in the range of 5 to 25 p.s.i.g. should provide sufficient control sensitivity yet simultaneously supply sufficient fluid pressure to drive the apparatus. It is with these problems and considerations that the present invention was conceived.

SUMMARY OF THE INVENTION

In a principal aspect, the present invention comprises a fluid controlled and driven motor which becomes operative whenever actuated by a fluid input signal in response to fluid control means. The fluid input signal to the motor and the fluid pressure at which the fluid control means operate is substantially the same. The fluid control means includes means for sensing a physical parameter and means for logically responding to the sensed parameter to provide an output signal which operates to drive the fluid motor means.

It is thus an object of the present invention to provide fluid controlled and operated motor means wherein the fluid control and the fluid driven motor operate at substantially the same pressure.

It is a further object of the present invention to provide fluid controlled and operated motor means which eliminates the necessity for interfacing between the control section of the device and the motor section of the device.

Still another object of the present invention is to provide fluid controlled and operated motor means which can be economically manufactured and easily adapted for numerous applications.

One further object of the present invention is to provide a compact combination of fluid operated control means and motor.

These and other objects, advantages, and features of the present invention will be set forth in greater detail below.

BRIEF DESCRIPTION OF THE DRAWINGS

In the detailed description which follows, reference will be made to the drawings comprised of the following FIGS.:

FIGS. 3 through 8 are opposite end views of the components of the fluid logic control system for the fluid motor taken substantially along the lines 3—3, 4—4, 5—5, 6—6, 7—7 and 8—8 of FIG. 2.

DETAILED DESCRIPTION OF THE PREFERRED EMBODIMENT

Figure 1:
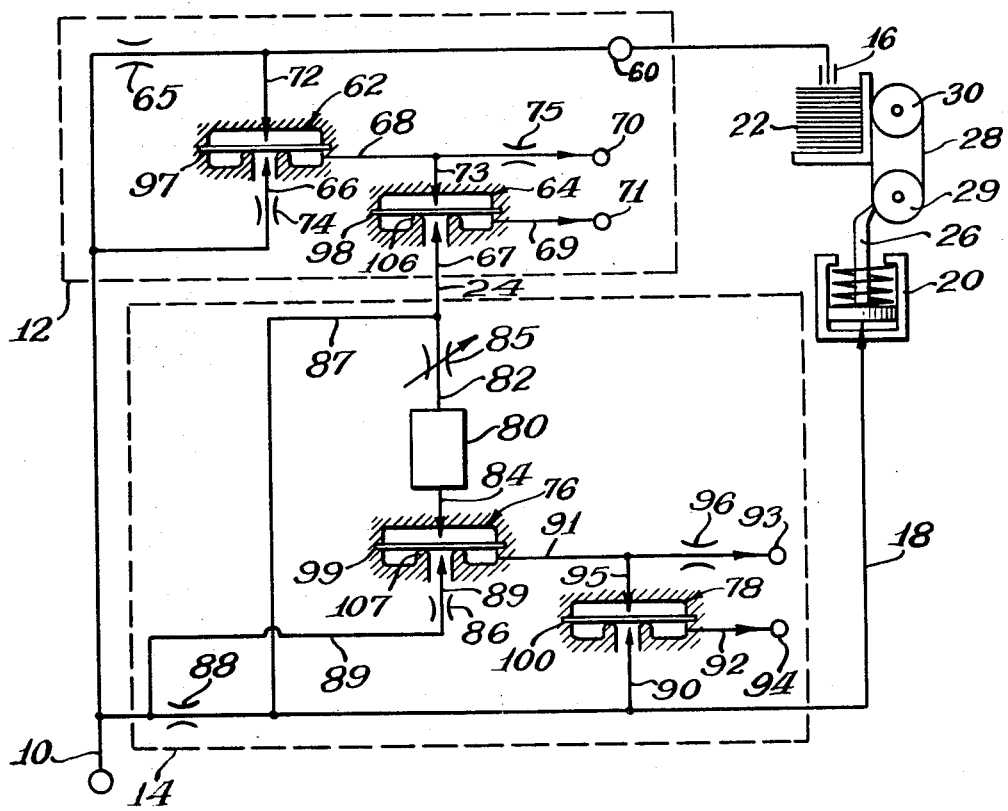
FIG. 1 is a diagrammatic circuit diagram of the combined motor and control means of the invention.

FIG. 1 illustrates, in a diagrammatic view, the fluid circuitry of the control means for the controlled fluid motor of the present invention. An external fluid pressure supply is provided through a supply conduit 10. The nominal operating pressure of the system is 10 p.s.i.g. with the range being from 5 to 25 p.s.i.g. The supply conduit 10 is connected to a fluid inhibitor 12 and an oscillator 14 which comprise the control means of the invention. Thus, the control means (i.e. the inhibitor 12 and the oscillator 14) and the fluid motor comprising the device both have their origin of fluid flow at the supply conduit 10.

A proximity sensor 16 is connected to the inhibitor 12 and a fluid motor drive conduit 18 is connected from the oscillator 14 to a fluid drive motor 20. As shown in FIG. 1, the sensor 16 senses a gap between the sensor 16 and an object 22 such as a stack of papers and provides a signal to the inhibitor 12. The inhibitor 12, in turn, provides a signal through a conduit 24 to the oscillator 14. If an appropriate gap is not sensed by the sensor 16, then a fluid output through conduit 18 from oscillator 14 causes the reciprocating piston-type, air motor 20 to reciprocate and drive the object 22 to an appropriate distance or gap from sensor 16.

A piston rod 26 is thus cased to reciprocate in response to operation of the motor 20, thereby driving an endless belt 28 clockwise about pulleys 29 and 30 and causing an attached paper carrier 22 to rise toward the sensor 16. When the papers on carrier 22 are an appropriate distance from sensor 16, the signal through conduit 24 from inhibitor 12 to oscillator 14 causes fluid output from oscillator 14 to cease. Consequently, carrier 22 remains in a fixed position until sensor 16 again senses an inappropriate gap.

Figure 2:
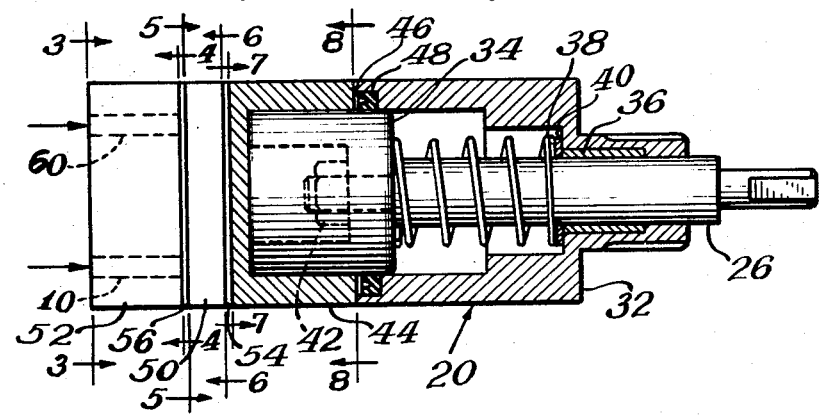
FIG. 2 is a partial cross-sectional view of the motor and control system of the invention.

Construction of the air motor 20 is more completely illustrated in FIG. 2. The motor 20 includes a body or cylinder housing 32 having a piston 34 slidably mounted therein. The piston rod 26 is attached to the piston 34 and extends through the end of the body 32 against a bearing 36 to insure that the rod 26 is in smooth sealing engagement with the body 32. The rod 26 is held in communication with the piston 34 by means of a nut 42 which is threadedly attached to the inner end to the rod 26 that passes through an opening in the head of the piston 34. A spring 38 is slidably fitted over the rod 26 between the piston 34 and a washer 40 on the inside of the body 32. The spring 38 acts to bias the piston 34 against fluid pressure input from conduit 18 to the air motor.

Figure 7:
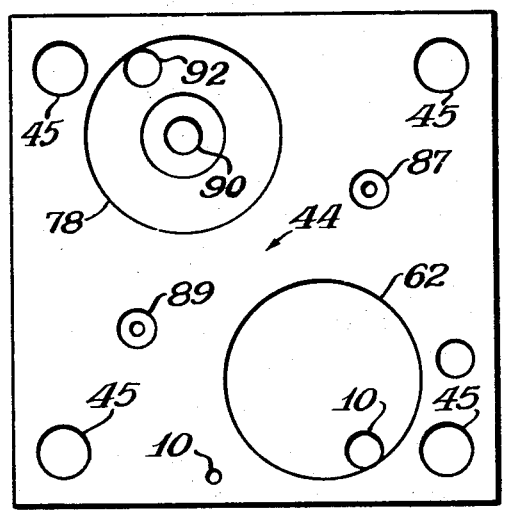
Figure 8:
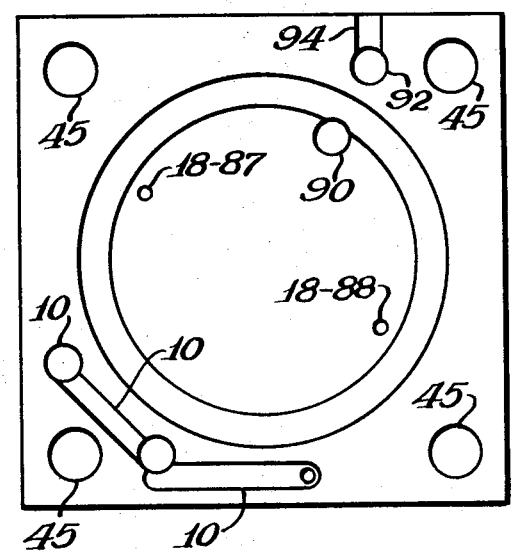

A base 44 cooperates with the body 32 to provide a cylinder chamber against the piston 34. The base 44 is held in sealing engagement with the body 32 by fastening means (not shown) through openings 45 in FIGS. 7 and 8. A gasket 46 and U-cup 48 insure a tight seal between the base 44 and body 32.

The base 44, a valve plate 50, a cover 52, and first and second flexible membranes 54 and 56 cooperate to provide the logic sensing and control means on the inhibitor 12 and oscillator 14 depicted in FIG. 1. The plan views of the base 44 and the valve plate 50 and the cover 52 are illustrated in FIGS. 3 through 8. The portions of the logic circuit numbered in FIG. 1 are correspondingly numbered in FIGS. 2 through 8. Thus, in FIGS. 2 and 3, an opening 10 in cover plate 52 corresponds to the conduit 10 in FIG. 1. A second opening 60 corresponds to the conduit 60 from the sensor 16 in FIG. 1.

Referring now to FIGS. 1, 3—8, the inhibitor includes a first diaphragm valve or element 62 and a second diaphragm valve 64. These vales 62 and 64 each have an inlet 66 and 67, respectively, an outlet 68 and 69, respectively, leading to the atmosphere through openings 70 and 71, respectively, and a control inlet 72 and 73, respectively.

The control inlet 72 is connected through a restrictor 65 with the supply conduit 10 and the sensor conduit 60. Inlet 72 is adapted to receive signals from the sensor 16 which results from a change in the gap between sensor 16 and object 22. Inlet 66 is connected with supply conduit 10 through a restrictor 74. Outlet 68 connects with control inlet 73 and with the atmosphere through a restrictor 75 positioned downstream from the connection of outlet 68 with control inlet 73. As set forth before, the inhibitor 12 and oscillator 14 are connected by way of the conduit 24.

The oscillator 14 likewise includes a first diaphragm valve or element 76 and a second diaphragm valve 78. In addition, the oscillator 14 includes an accumulator chamber 80 having an inlet conduit 82 and an outlet conduit 84. The inlet conduit 82 is connected through a variable restrictor 85 to the control conduit 24 and also a supply conduit 87. The supply conduit 87 is connected with the main supply conduit 10 through a restrictor 88.

The first valve 76 and second valve 78 are arranged and constructed in the same manner as the valves 62 and 64 in the inhibitor 12 described above. Namely, the valves 76 and 78 each includes an inlet conduit 89 and 90, respectively, which connects with an outlet conduit 91 and 92, respectively. The outlet conduit 84 of the chamber 80 serves as the control inlet for the first diaphragm valve 76. The outlet conduit 91 of the first diaphragm 76 is connected to the control inlet conduit 95 of the second diaphragm valve 78. A restrictor 96 is positioned downstream from the connection of the control inlet 95 with the outlet conduit 91. The supply conduit 10 is connected through the restrictor 88 to the inlet conduit 90 of the second valve 78 and also connects by way of the outlet conduit 18 to the motor 20.

All of the diaphragm valves 62, 64, 76 and 78 includes flexible diaphragms 97 through 100 respectively in FIG. 1 which respond to fluid pressures through the respective control inlets and supply inlets. Of course, the diaphragms 97—100 diagrammatically represented in FIG. 1 correspond to a portion of the membranes 54 or 56 in FIG. 2 which are wedged between the cover plate 52 and valve plate 50, and valve plate 50 and baseplate 44, respectively.

For example, membrane 56 between cover plate 52 and valve plate 50 provides diaphragms 98 and 99 for valves 64 and 76 respectively. Depending upon the pressure acting upon the diaphragms 98 and 99 through the conduits on opposite sides of the diaphragms 98 and 99, the diaphragms 98 and 99 will be biased toward or away from ridges or seats 106 and 107 respectively.

The switching pressure of the diaphragm valves is therefore dependent upon the area of the diaphragm surface subject to pressure from conduits on opposite sides of the diaphragm. For example, diaphragm 99 will not flex to allow opening of valve 76 until the product of the supply pressure and the area of the inlet conduit 89 is equal to or greater than the product of the control pressure through conduit 84 and the area of the upper face of the diaphragm 99 as shown in FIG. 1. The remaining valves 62, 64 and 78 are similarly constructed and operative. Thus, switch pressures and response characteristics of the complete device may be controlled by controlling the dimensions and construction of the diaphragm valves, especially the ratio of the areas of the flexible membrane subjected to pressure.

Figure 9:
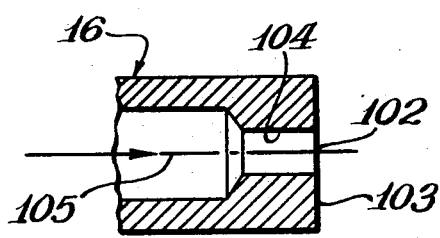
FIG. 9 is a cross-sectional view of a proximity sensor nozzle used in the control means.

Referring now to FIG. 9, there is shown a cross-sectional view of the proximity sensor 16 used in conjunction with the invention. Fluid passes through the sensor 16 in the direction indicated by the arrow. An outlet orifice 102 in the sensor 16 is formed by the intersection of an outside planar wall 103 and cylindrical walls of a passage 104 concentric about a centerline axis 105. The edge of the orifice 102 formed by the junction of the plane 103 and the sidewalls of the passage 104 is sharp, not rounded.

The operation of the device can be understood by reference again to FIG. 1. Operation of the inhibitor stage 12 and sensor 16 is first described. Proximity is sensed by a fluid jet, such as an air jet, eminating from the orifice 102 of the sensor 16.

With close proximity, air pressure in the line 60 is high. This causes the diaphragm 97 and valve 62 to close and thereby permits the diaphragm 98 and vale 64 to open, pressure in the valve element 64 being relieved through the restrictor 75. Thus, no pressure can build up in inlet 67 of valve 64 since fluid flow passes through outlet conduit 69 and through the opening 71 to the atmosphere. Consequently, no signal impulse is generated in conduit 24 which will activate the oscillator 14.

With an increased gap between the sensor 16 and the object 22, the pressure in conduit 60 decreases causing the valve 62 to open and air to flow through restrictors 74 and 75. This results in an increased pressure through control inlet 73. This, in turn, closes the valve 64. For this reason, pressure from the pressure conduit 87 can no longer be diverted through the conduit 24 to the inhibitor stage but must be diverted into the oscillator stage 14, making the oscillator 14 operative.

Proximity hyteresis can be adapted to requirements and is determined by relations of restrictor 65 to the orifice 102, the restrictor 74 and 75, and cavity to seat diameter of valve 62.

Referring now to the operation of the oscillator 14, when valve 64 of the inhibitor stage 12 is closed, air flows through the metering restrictor 85 into the accumulator chamber 80 gradually building line pressure in conduit 84. After a time interval, dependent upon the volume of chamber 80 and the construction of restrictor 84, equilibrium is reached on both sides of diaphragm 99 in valve 76. Valve 76 then closes. Pressure in outlet conduit 91 then discharges through atmospheric opening 93 causing valve 78 to open.

When valve 78 opens, pressure drops in supply line conduit 90 to element 78 causing air to exhaust from the cylinder of the motor 20 through the conduit 18 and ultimately out atmospheric vent or opening 94. Also, since pressure in conduit 90 drops, air flows from the chamber 80 through the conduit 82, variable restrictor 85 and conduit 87 at a metered rate. This causes gradual pressure drop in conduit 84 and eventually causes element 76 to open.

Air now enters through restrictor 86 causing element 78 to close. Air through the supply restrictor 88 can then no longer pass to the atmosphere and pressure builds up on conduit 18 to drive the piston 34 of the motor 20 against the biasing force of the spring 38. Air also reenters conduit 87, passes through the variable restrictor 85 and ultimately into the chamber 80 repeating the above-described oscillation operation. This process continues until the belt 28 is driven sufficiently far enough in a clockwise sense so that the inhibitor 12 senses a suitable proximity of the sensor 16 from object 22 thus causing valve 64 to open and oscillator 14 to become inoperative. Note that piston rod 26 cooperates with the belt 28 as a ratchet mechanism to drive the belt 28 in a clockwise sense.

The oscillator 14 and inhibitor 12 can be built as separate units to serve independent applications such as proximity sensing for the inhibitor 12 or time based automatic cycling for the oscillator 14. For example, an inhibitor 12 could be used for proximity sensing and could be coupled with a NOT gate to provide an outlet which would drive a rotary-type air motor. Such a construction would accomplish a result similar to that described for the piston-type motor, oscillator and inhibitor combination described above and claimed hereinafter.

I claim:

1. Fluid driven motor means with fluid operated control means operative simultaneously at substantially the same fluid pressure comprising, in combination:
   fluid driven motor means; and
   fluid pressure sensing means for sensing a measurable physical parameter and providing a logically responsive fluid output signal indicative of said physical parameter, said fluid pressure sensing means including;
   a pressure supply,
   pressure input signal means indicative of the measurable physical parameter,
   first and second diaphragm valve means, each of said valve means including a fluid flow inlet connected to said pressure supply, a fluid flow outlet connected to the atmosphere, and a control inlet, said input signal means being connected to said control inlet of said first valve means, said fluid flow outlet of said first valve means also being connected with the control inlet of said second valve means such that an input signal closes the fluid flow path from said inlet to said outlet of said first valve means and thereby opens the fluid flow path from said inlet to said outlet of said second valve means, said logically responsive output signal being thereby associated with the fluid flow path of said second valve means, and fluid oscillator means for receiving said logically responsive output signal from said fluid pressure sensing means and responsive to said output signal by providing an oscillating fluid output driving signal to said motor means until said logically responsive output signal terminates.

2. The combination of claim 1 wherein said pressure input signal means includes a proximity sensor for detecting a gap between said signal means and an object, and proximity sensor including an orifice for fluid discharge.

3. The combination of claim 1 wherein said combination includes first restrictor means at said inlet to said first valve means and a second restrictor means at said outlet of said first valve means to the atmosphere.

4. The combination of claim 1 wherein said motor means includes a piston responsive to fluid flow output from said oscillator means, said piston operative to drive a piston rod which in turn changes said measurable parameter to a substantially preselected value sensed by said sensing means.

5. The combination of claim 1 including restrictor means in said supply to said sensing means.

6. The combination of claim 1 wherein said motor means operates means to alter said measured parameter so that said logically responsive output of said fluid pressure sensing means is terminated.

7. Fluid driven motor means with fluid operated control means operative simultaneously at substantially the same fluid pressure comprising, in combination:

fluid driven motor means;

fluid pressure sensing means for sensing a measurable physical parameter and providing a logically responsive fluid output signal indicative of said physical parameter; and fluid oscillator means for receiving said output signal from said fluid sensing means and responsive to said output signal by providing an oscillating fluid output driving signal to said motor means until said logically responsive output signal terminates, said oscillator means including;

an accumulator chamber having an inlet and an outlet, a first diaphragm valve means and a second diaphragm valve means, each of said valve means having a fluid flow inlet connected to a pressure supply, a fluid flow outlet connected to the atmosphere and a control inlet, said accumulator chamber adapted to accumulate fluid in said accumulator resulting from said logically responsive fluid output signal of said fluid pressure sensing means to thereby provide an accumulator outlet signal to said control inlet of said first valve means following a time interval to fill said chamber, said chamber outlet signal operative to close said first valve means and restrict fluid flow from said first valve means inlet through said first valve means outlet thereby to restrict a signal from said first valve means outlet to said control inlet of said second valve means, thereby to open said flow path from said second valve means inlet to said second valve means outlet, and said second valve means inlet being also connected to said fluid motor means and providing an exhaust to said motor means when said fluid flow path through said second valve means inlet and outlet to the atmosphere is open, said chamber inlet also being connected to said inlet of said second valve means through restrictor means thereby to exhaust said chamber simultaneously with the exhaustion of said motor means such that upon exhaustion of said chamber, said first valve means opens and said second valve means closes thereby to provide said motor with fluid until said accumulator chamber again accumulates fluid causing the system to oscillate.

8. The combination of claim 7 wherein said restrictor means is variable.

9. The combination of claim 7 wherein said combination includes second restrictor means at said inlet to said first valve means and third restrictor means at said outlet of said first valve means to the atmosphere.

10. The combination of claim 7 wherein said motor means includes a piston responsive to fluid flow output from said oscillator means, said piston operative to drive a piston rod which in turn operates means to change said measurable parameter to a substantially preselected value sensed by said sensing means.

11. The combination of claim 7 including restrictor means in said supply to said oscillator means.

12. The combination of claim 7 wherein said motor means operates means to alter said measured parameter so that said logically responsive output of said fluid pressure sensing means is terminated.